US011929786B2

(12) United States Patent
Nishimura et al.

(10) Patent No.: US 11,929,786 B2
(45) Date of Patent: Mar. 12, 2024

(54) OPTICAL COMMUNICATION DEVICE (71) Applicants: SHIMADZU CORPORATION, Kyoto (JP); JAPAN AGENCY FOR MARINE-EARTH SCIENCE AND TECHNOLOGY, Yokosuka (JP)

(72) Inventors: Naoki Nishimura, Kyoto (JP); Takao Sawa, Yokosuka (JP)

(73) Assignees: Shimadzu Corporation, Kyoto (JP); JAPAN AGENCY FOR MARINE-EARTH SCIENCE AND TECHNOLOGY, Yokosuka (JP)

( * ) Notice: Subject to any disclaimer, the term of this patent is extended or adjusted under 35 U.S.C. 154(b) by 81 days.

(21) Appl. No.: 17/772,075

(22) PCT Filed: Nov. 8, 2019

(86) PCT No.: PCT/JP2019/043897
§ 371 (c)(1),
(2) Date: Apr. 26, 2022

(87) PCT Pub. No.: WO2021/090481
PCT Pub. Date: May 14, 2021

(65) Prior Publication Data
US 2022/0376796 A1 Nov. 24, 2022

(51) Int. Cl.
*H04B 10/60* (2013.01)
*G02B 6/42* (2006.01)
*H04B 10/80* (2013.01)

(52) U.S. Cl.
CPC ........... *H04B 10/60* (2013.01); *G02B 6/4206* (2013.01); *H04B 10/80* (2013.01)

(58) Field of Classification Search
CPC ....... H04B 10/60; H04B 10/80; G02B 6/4206
USPC .......................................... 398/104
See application file for complete search history.

(56) References Cited

U.S. PATENT DOCUMENTS

| 7,609,306 | B2 | 10/2009 | Oda |
| 9,438,338 | B1 * | 9/2016 | Chan ..................... H04B 10/11 |
| 2001/0043381 | A1 * | 11/2001 | Green ................ H04B 10/2587 398/126 |
| 2007/0058989 | A1 | 3/2007 | Kaku et al. |

(Continued)

FOREIGN PATENT DOCUMENTS

JP H05-259512 A 10/1993
JP H06-164499 A 6/1994

(Continued)

OTHER PUBLICATIONS

Extended European Search Report (EESR) dated Jul. 4, 2023 in the corresponding European patent application No. 19951878.8.

(Continued)

*Primary Examiner* — Li Liu
(74) *Attorney, Agent, or Firm* — Muir Patent Law, PLLC (57) ABSTRACT This optical communication device (1) is provided with: a plurality of light-receiving elements (11) configured to receive communication light, the plurality of light-receiving elements being provided so as to correspond to a plurality of channels; and a controller (15) configured to perform control to invalidate output from a light-receiving element that has received high-intensity light higher in light intensity than a predetermined value among the plurality of light-receiving elements.

5 Claims, 4 Drawing Sheets (56) References Cited

U.S. PATENT DOCUMENTS

| | | | |
|---|---|---|---|
| 2017/0048005 A1* | 2/2017 | Lacovara | G01V 1/226 |
| 2018/0091221 A1 | 3/2018 | Bitra et al. | |
| 2021/0286139 A1* | 9/2021 | Oyama | G02B 27/30 |

FOREIGN PATENT DOCUMENTS

| | | | |
|---|---|---|---|
| JP | H06164499 A | * | 6/1994 |
| JP | 08079184 A | * | 3/1996 |
| JP | H08-079184 A | | 3/1996 |
| JP | 4317117 B2 | | 5/2009 |
| JP | 2014-016809 A | | 1/2014 |
| JP | 2014016809 A | * | 1/2014 |
| JP | 2016-201790 A | | 12/2016 |
| JP | 2018-007069 A | | 1/2018 |
| WO | 2010068499 A1 | | 6/2010 |
| WO | 2018/079091 A1 | | 5/2018 |

OTHER PUBLICATIONS

Notice of Reasons for Refusal dated Mar. 14, 2023 for corresponding Japanese Patent Application No. 2021-554539.
Written Opinion by the International Search Authority for PCT application No. PCT/JP2019/043897 dated Dec. 17, 2019, submitted with a machine translation.
First Office Action dated Mar. 17, 2021 for corresponding Taiwanese Patent Application No. TW 109135775, submitted with a machine translation.
Second Office Action dated Jun. 29, 2021 for corresponding Taiwanese Patent Application No. TW 109135775, submitted with a machine translation.

* cited by examiner

Modification

US 11,929,786 B2

OPTICAL COMMUNICATION DEVICE

TECHNICAL FIELD

The present invention relates to an optical communication device.

BACKGROUND OF THE INVENTION

Conventionally, an optical communication device for performing communication using communication light is known. Such an optical communication device is disclosed, for example, in Japanese Unexamined Patent Application Publication No. 2018-7069.

The above-described Japanese Unexamined Patent Application Publication No. 2018-7069 discloses a first optical communication instrument (optical communication device) mounted on a submersible navigating underwater and a second optical communication instrument (optical communication device) mounted on a marine vessel or another submersible navigating underwater. Further, the above-described Japanese Unexamined Patent Application Publication No. 2018-7069 discloses that an optical signal using communication light which is visible light is transmitted through the water between the first optical communication instrument and the second optical communication instrument. Each of the first optical communication instrument and the second optical communication instrument is provided with one or a plurality of light-receiving elements inside a housing.

PRIOR ART DOCUMENT

Patent Document
Patent Document 1: Japanese Unexamined Patent Application Publication No. 2018-7069

SUMMARY OF THE INVENTION

Problems to be Solved by the Invention

In a conventional optical communication device as described in the above-described Japanese Unexamined Patent Application Publication No. 2018-7069, the light-receiving element may receive not only communication light but also disturbance light, such as, e.g., sunlight. In a case where any of the plurality of light-receiving elements of the conventional optical communication device have received high-intensity disturbance light, the output (signal) from the light-receiving element that has received high-intensity disturbance light saturates, and therefore, there is a problem that the light-receiving element that has received the high-intensity disturbance light may be damaged. Further, in a case where the output from the light-receiving element that has received high-intensity disturbance light saturates, optical communication of light-receiving elements other than the light-receiving element that has received high-intensity disturbance light may be adversely affected. In this case, there is also a problem that it becomes impossible to perform optical communication by light-receiving elements other than the light-receiving element that has received high-intensity disturbance light, as usual.

The present invention has been made to solve the above-described problems. One object of the present invention is to provide an optical communication device capable of preventing a light-receiving element that has received high-intensity disturbance light from being damaged and also capable of performing optical communication by light-receiving elements other than the light-receiving element that has received high-intensity disturbance light even in a case where any of the plurality of light-receiving elements have received high-intensity disturbance light.

Means for Solving the Problem

In order to attain the above-described object, an optical communication device according to one aspect of the present invention includes:
a plurality of light-receiving elements each configured to receive communication light, the plurality of light-receiving elements being provided so as to correspond to a plurality of channels; and
a controller configured to perform control to invalidate output from a light-receiving element that has received high-intensity light higher in light intensity than a predetermined value among the plurality of light-receiving elements.

Here, the term "invalidate output" denotes a broad concept including "stop output," "ignore output," or the like.

Effects of the Invention

According to the present invention, as described above, a controller is provided. The controller is configured to perform control to invalidate output from a light-receiving element that has received high-intensity light higher in light intensity than a predetermined value among a plurality of light-receiving elements. With this configuration, in a case where any of the light-receiving elements among the plurality of light-receiving elements have received high-intensity disturbance light as high-intensity light, the output from the light-receiving element that has received the high-intensity disturbance light can be invalidated. Consequently, it is possible to prevent the light-receiving element that has received the high-intensity disturbance light from being damaged due to saturation of the output (signal) from the light-receiving element that has received the high-intensity disturbance light. Further, it is possible to prevent the optical communication by the light-receiving elements other than the light-receiving element that has received the high-intensity disturbance light from being adversely affected. Therefore, even in a case where any light-receiving elements among the plurality of light-receiving elements have received high-intensity disturbance light, it is possible to perform optical communication by light-receiving elements other than the light-receiving element that has received the high-intensity disturbance light, as normal.

EMBODIMENTS FOR CARRYING OUT THE INVENTION

Hereinafter, some embodiments in which the present invention is embodied will be described with reference to the attached drawings.
(Underwater Optical Communication System)

Figure 1:
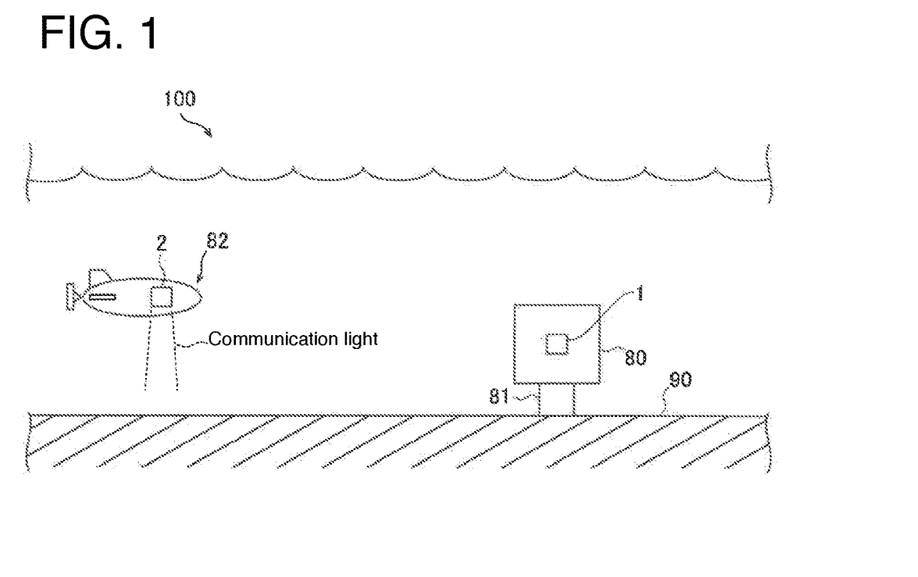
FIG. 1 is a schematic diagram showing a schematic configuration of an underwater optical communication system according to one embodiment.

With reference to FIG. 1, a configuration of an underwater optical communication system 100 provided with an optical communication device according to one embodiment will be described.

As shown in FIG. 1, the underwater optical communication system 100 is provided with a first optical communication device 1 and a second optical communication device 2. Note that the first optical communication device 1 is an example of the "optical communication device" recited in claims.

The first optical communication device 1 is arranged in water, such as, e.g., in the sea. Specifically, the first optical communication device 1 is provided to a fixed body 80 fixed underwater. The fixed body 80 is fixed in water by being installed on a water bottom 90 via a holding member 81.

The second optical communication device 2 is arranged in water, such as, e.g., in the sea. Specifically, the second optical communication device 2 is mounted to a moving body 82 that moves underwater. The moving body 82 includes, for example, an AUV (Autonomous Underwater Vehicle).

In this embodiment, the underwater optical communication system 100 is configured to be able to perform optical communication between the first optical communication device 1 and the second optical communication device 2 by receiving the communication light emitted from the first optical communication device 1 by the second optical communication device 2 and perform optical communication between the second optical communication device 2 and the first optical communication device 1 by receiving the communication light emitted from the second optical communication device 2 by the first optical communication device 1. Note that FIG. 1 illustrates an example in which the second optical communication device 2 is emitting the communication light.

In this embodiment, the moving body 82 moves through the sea to perform an inspection of, for example, a structure laid on the seabed. The second optical communication device 2 is configured to transmit the inspection result acquired by a detector (not shown) mounted to the moving body 82 to the first optical communication device 1 by communication light. Further, the first optical communication device 1 is configured to receive the inspection result transmitted from the second optical communication device 2 and transmit the received inspection result to a communication device provided on land, a mother ship, or the like. Note that in a case where optical communication is performed between the first optical communication device 1 and the second optical communication device 2, the optical communication is performed by moving the moving body 82 to the communicable region.

Figure 2:
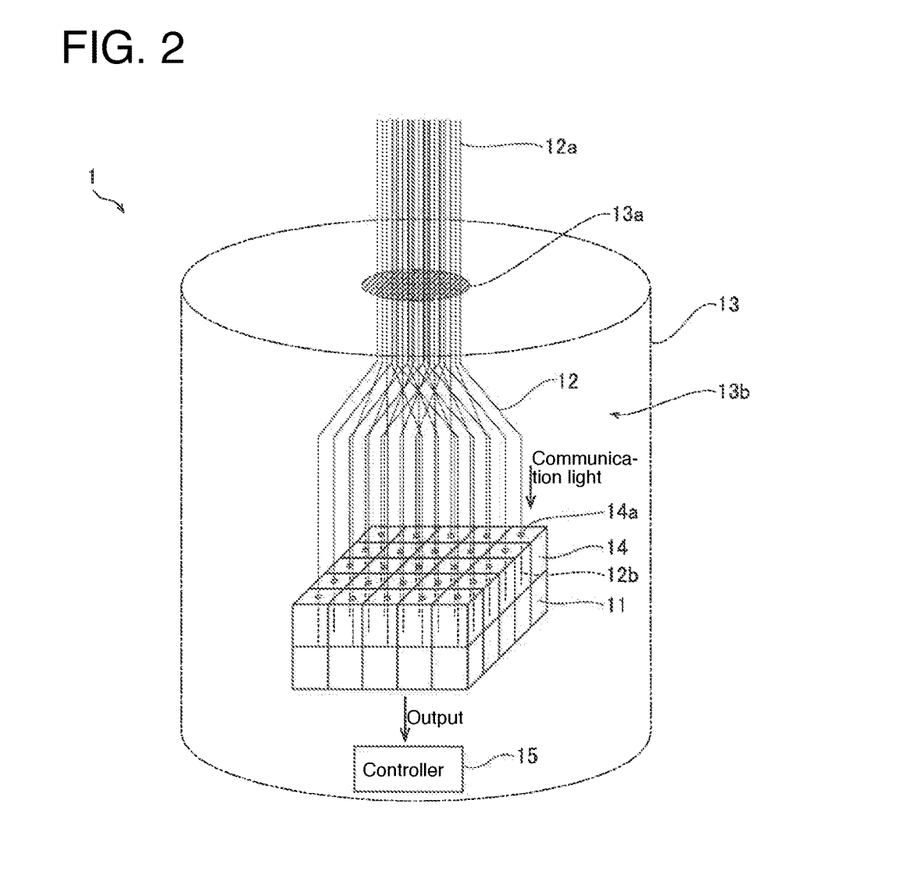
FIG. 2 is a schematic diagram showing a schematic configuration of a light-receiving unit of an underwater communication device according to one embodiment.

As shown in FIG. 2, the first optical communication device 1 is provided with a plurality of light-receiving elements 11. The plurality of light-receiving elements 11 is configured to receive the communication light in water. The plurality of light-receiving elements 11 is provided so as to correspond to a plurality of channels. Although the number of channels is not particularly limited, in the example shown in FIG. 2, the first optical communication device 1 is provided with twenty-five (25) channels. Therefore, in the example shown in FIG. 2, the first optical communication device 1 is provided with twenty-five (25) light-receiving elements 11.

The plurality of light-receiving elements 11 is each configured by, for example, a photomultiplier tube. In this case, each of the plurality of light-receiving elements 11 includes a photoelectric converter 11a (see FIG. 4) and an electronic multiplier 11b (see FIG. 4). The photoelectric converter 11a has a light-receiving surface and is configured to convert the light, such as, e.g., communication light, received by the light-receiving surface into electrons. The electronic multiplier 11b is configured to multiply the electrons converted by the photoelectric converter 11a by being applied by a high voltage. Further, the plurality of light-receiving elements 11 is arranged in an array. Note that the term "arranged in an array" denotes a concept including "arranged in a row," "arranged in a matrix," and the like. In the example shown in FIG. 2, the plurality of light-receiving elements 11 is arranged in a matrix of 5×5.

The first optical communication device 1 is provided with a plurality of optical fibers 12. The plurality of optical fibers 12 is configured to guide light, such as, e.g., communication light, to the plurality of light-receiving elements 11. The plurality of optical fibers 12 is provided so as to correspond to the plurality of light-receiving elements 11. That is, in the example shown in FIG. 2, the plurality of optical fibers 12 includes twenty-five (25) optical fibers. Each of the plurality of optical fibers 12 includes a light-incident end portion 12a (light collection end portion) for light, such as, e.g., communication light, and a light-emission end portion 12b for light, such as, e.g., communication light.

Each of the plurality of light-emission end portions 12b is arranged in the vicinity of each of the plurality of light-receiving elements 11. Each of the plurality of light-emission end portions 12b is arranged so as to face the light-receiving surface of each of the plurality of light-receiving elements 11. Each of the plurality of light-incident end portions 12a is configured to be capable of being arranged at a predetermined position in a predetermined direction. That is, at least some of the plurality of light-incident end portions 12b can be arranged at positions different from each other in directions different from each other.

The first optical communication device 1 is provided with a sealed pressure-resistant container 13 (shown by dashed double-dashed lines), which is a protective container. The sealed pressure-resistant container 13 is exposed in the water and is configured to accommodate the plurality of light-receiving elements 11 and a controller 15 which will be described below. The sealed pressure-resistant container 13 is configured to isolate the plurality of light-receiving elements 11 and the controller 15 from the external environment. The sealed pressure-resistant container 13 has, for example, a cylindrical configuration.

The plurality of optical fibers 12 is configured such that the light-emission end portions 12b are provided inside the sealed pressure-resistant container 13 and that the light-incident end portions 12a are provided outside (i.e., underwater) the sealed pressure-resistant container 13. Each of the plurality of light-incident end portions 12a is configured to be able to be disposed at a predetermined position in a predetermined direction outside (underwater) the sealed pressure-resistant container 13. The plurality of optical fibers 12 is disposed so as to extend from the inside to the outside of the sealed pressure-resistant container 13 via the insertion portion 13a of the sealed pressure-resistant container 13. The insertion portion 13a is configured to allow the plurality of optical fibers 12 to be inserted therethrough while maintaining the inner space 13b of the sealed pressure-resistant container 13 in a sealed state (watertight state).

Figure 3:
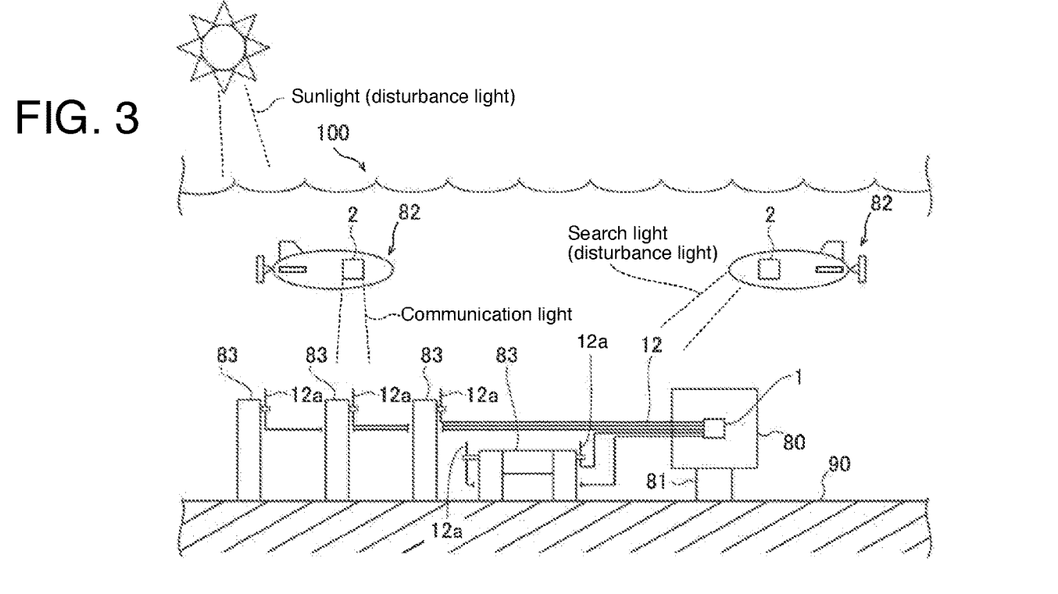
FIG. 3 is a schematic diagram showing an example of an arrangement of optical fibers of an underwater communication device according to one embodiment.

Further, the first optical communication device 1 is provided with light-emission end portion holders 14. The light-emission end portion holders 14 are configured to hold the plurality of light-emission end portions 12b in the vicinity of the plurality of light-receiving elements 11. The plurality of light-emission end portion holders 14 is provided so as to correspond to the plurality of light-receiving elements 11 and a plurality of light-emission end portions 12b. That is, in the example shown in FIG. 2, twenty-five (25) light-emission end portion holders 14 are provided. Each of the plurality of light-emission end portion holders 14 is provided integrally with the light-receiving surface of each of the plurality of light-receiving elements 11. Each of the plurality of light-emission end portion holders 14 has an insertion hole 14a. The insertion hole 14a is configured to allow the light-emission end portion 12b to be inserted therethrough. Each of the plurality of light-emission end portions 12b is configured to be held by the light-emission end portion holder 14 in a state of being inserted into the insertion hole 14a As shown in FIG. 3, at least some of the plurality of light entrance end portions 12a are arranged at different positions in water. The number of arrangement positions of the light entrance end portions 12a is not particularly limited. FIG. 3 illustrates an example in which a plurality of light entrance end portions 12a is arranged at five positions different from each other. In this instance, the moving body 82 can perform optical communication at five different locations (communication areas) different from each other.

At least some of the plurality of light-incident end portion 12a are attached to underwater structures 83. The underwater structure 83 is not specifically limited, and may be, for example, a column, a rod, a wall, etc. As the underwater structure 83, a structure may be provided for the first optical communication device 1, or an existing structure may be used. The light-incident end portion 12a is attached to the underwater structure 83 via a fixture.

Figure 4:
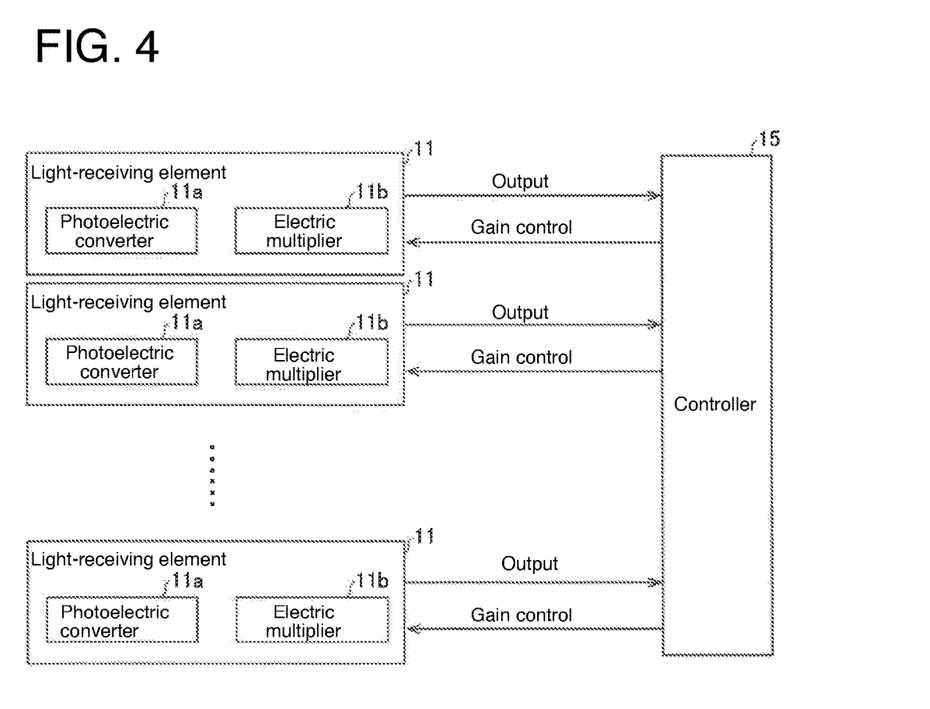
FIG. 4 is a block diagram showing a light-receiving element and a controller of an underwater communication device according to one embodiment.

As shown in FIGS. 2 and 4, the first optical communication device 1 is provided with a controller 15. The controller 15 is a control circuit including a processor, such as, e.g., a CPU, and a memory. The controller 15 is configured to be able to individually acquire each output from the plurality of light-receiving elements 11. Further, the controller 15 is configured to be able to individually control the gain of each of the plurality of light-receiving elements 11. Thus, the controller 15 is configured to be able to individually control the sensitivity of each of the plurality of light-receiving elements 11.

Figure 5:
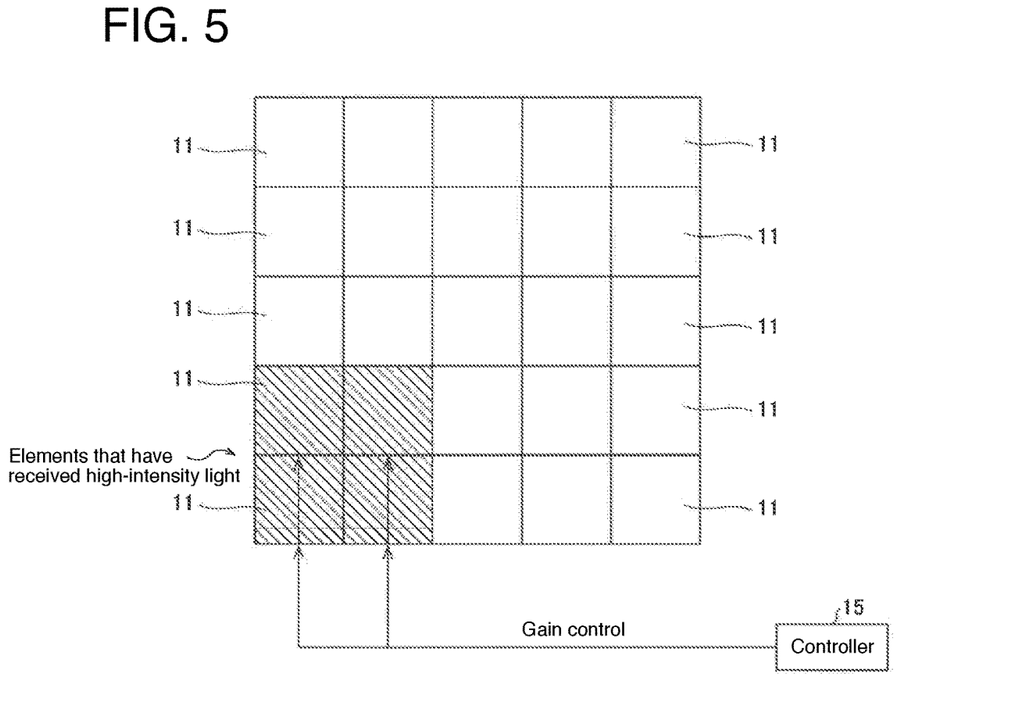
FIG. 5 is a schematic diagram for explaining a case in which light-receiving elements of an underwater communication device according to one embodiment have received high-intensity light.

Here, in this embodiment, as shown in FIG. 5, the controller 15 is configured to perform control to invalidate output from a light-receiving element 11 that has received high-intensity light without invalidating the outputs from light-receiving elements 11 other than the light-receiving element 11 that has received high-intensity light higher in light intensity than a predetermined value among the plurality of light-receiving elements 11. Note that in FIG. 5, in order to facilitate understanding, the light-receiving elements 11 that have received high-intensity light are illustrated with hatching.

For example, in a case where high-intensity disturbance light is emitted, the controller 15 is configured to perform control to invalidate the outputs from the light-receiving elements 11 that have received high-intensity light including the high-intensity disturbance light, without invalidating the outputs from light-receiving elements 11 other than the light-receiving elements 11 that have received the high-intensity light including the high-intensity disturbance light among the plurality of light-receiving elements 11. As the disturbance light that may be received by the light-receiving element 11, sunlight, search light of the moving body 82, and the like, can be exemplified.

Further, for example, in a case where high-intensity communication light is emitted, the controller 15 is configured to perform control to invalidate the outputs from the light-receiving elements 11 that have received high-intensity light including high-intensity communication light, without invalidating the outputs from light-receiving elements 11 other than the light-receiving elements 11 that have received the high-intensity light among the plurality of light-receiving elements 11. As a case in which high-intensity communication light is emitted, a case in which communication light is emitted in the vicinity of the light-incident end portion 12a can be exemplified.

Specifically, the controller 15 is configured to perform control to detect that the light-receiving element 11 has received high-intensity light including high-intensity disturbance light, high-intensity communication light, and the like, based on the output from the light-receiving element 11. More specifically, the controller 15 is configured to adjust the gain (amplification factor) of the electronic multiplier 11b of the light-receiving element 11 based on the output from the light-receiving element 11 and detect that the light-receiving element 11 has received high-intensity light when the adjusted gain of the electronic multiplier 11b has exceeded a limit value. Further, the controller 15 is configured to perform control to invalidate the output from the light-receiving element 11 that has received high-intensity light when it is detected that the light-receiving element 11 has received high-intensity light.

The control of invalidating the output from the light-receiving element 11 is not particularly limited. For example, the output from the light-receiving element 11 may be stopped by sufficiently reducing the gain of the electronic multiplier 11b of the light-receiving element 11 that has received high-intensity light to invalidate the output from the light-receiving element 11. Further, for example, the output from the light-receiving element 11 may be invalidated by ignoring the output from the light-receiving element 11 that has received high-intensity light.

(Invalidation Processing)

Next, with reference to FIG. 6, an example of the invalidation processing of the first optical communication device 1 according to this embodiment will be described based on a flowchart. Note that the invalidation processing is processing to be performed individually for each of the plurality of light-receiving elements 11. That is, FIG. 6 shows invalidation processing to be performed on a single light-receiving element 11.

Figure 6:
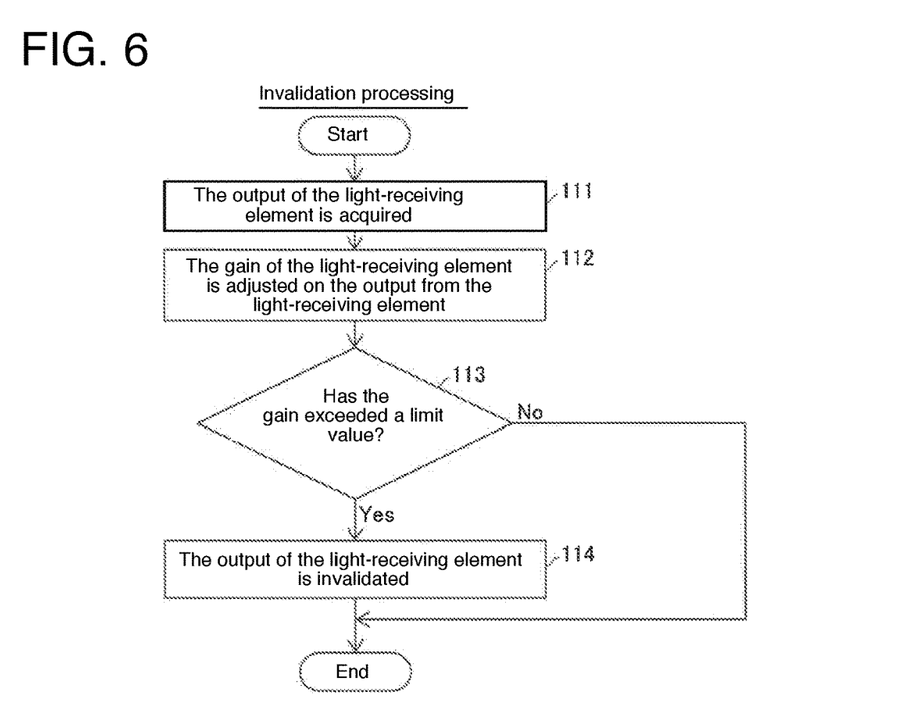
FIG. 6 is a flowchart for explaining the invalidation processing of an underwater communication device according to one embodiment.

As shown in FIG. 6, first, in Step 111, the output from the light-receiving element 11 is acquired. That is, in Step 111, the intensity of the light including disturbance light, communication light, and the like received by the light-receiving element 11 is acquired. Then, in Step 112, the gain of the electronic multiplier 11b of the light-receiving element 11 is adjusted based on the output from the light-receiving element 11. In Step 113, it is determined whether or not the adjusted gain of the electronic multiplier 11b has exceeded a limit value.

In a case where it is determined in Step 113 that the gain of the electronic multiplier 11b has exceeded the limit value, the processing proceeds to Step 114. Then, in Step 114, the output of the light-receiving element 11 in which the gain of the electronic multiplier 11b has exceeded the limit value is invalidated. Then, invalidation processing is terminated. Further, in a case where it is determined that the gain of the electronic multiplier 11b has not exceeded the limit value in Step 113, the invalidation processing is terminated without invalidating the output from the light-receiving element 11. In a case where it is determined in Step 113 that the gain of the electronic multiplier 11b has not exceeded the limit value, the output from the light-receiving element 11 is effectively used for optical communication.

Effects of this Embodiment

In this embodiment, the following effects can be obtained.

In this embodiment, as described above, the controller 15 is provided. The controller 15 is configured to perform control to invalidate the output from the light-receiving element 11 that has received high-intensity light higher in light intensity than a predetermined value among the plurality of light-receiving elements 11. With this, in a case where any of the plurality of light-receiving elements 11 among the plurality of light-receiving elements have received high-intensity disturbance light as high-intensity light, it is possible to invalidate the output from the light-receiving element 11 that has received the high-intensity disturbance light. Consequently, it is possible to prevent the light-receiving element 11 that has received high-intensity disturbance light from being damaged due to saturation of the output (signal) of the light-receiving element 11 that has received the high-intensity disturbance light. Further, it is possible to prevent the optical communication by the light-receiving elements 11 other than the light-receiving element 11 that has received high-intensity disturbance light from being adversely affected. Therefore, even in a case where some light-receiving elements 11 among the plurality of light-receiving elements 11 have received the high-intensity disturbance light, it is possible to perform optical communication by light-receiving elements 11 other than the light-receiving elements 11 that have received the high-intensity disturbance light, as normal.

Further, in this embodiment, as described above, the controller 15 is configured to perform control to invalidate the output from the light-receiving element 11 that has received high-intensity light including high-intensity disturbance light among the plurality of light-receiving elements 11. Thus, even in a case where the first optical communication device 1 is placed in an environment susceptible to high-intensity disturbance light, it is possible to perform optical communication while reducing the effect of the high-intensity disturbance light.

Further, in this embodiment, as described above, the controller 15 is configured to perform control to invalidate the output from the light-receiving element 11 that has received high-intensity light including high-intensity communication light among the plurality of light-receiving elements 11. Thus, it is possible to invalidate the output from the light-receiving element 11 that has received high-intensity light including high-intensity communication light in a case where the light-receiving element 11 has received high-intensity light including high-intensity communication light. Therefore, it is possible to suppress high-load from being applied to the light-receiving element 11 that has received high-intensity light including high-intensity communication light. Consequently, it is possible to suppress deterioration of the light-receiving element 11 due to the light reception of high-intensity communication light, and therefore, it is possible to prolong the life of the light-receiving element 11. Further, even in a case where the light-receiving element 11 has received high-intensity light including high-intensity communication light, it is possible to invalidate the output from the light-receiving element 11 that has received high-intensity light including high-intensity communication light. Therefore, for the light-receiving elements 11 other than the light-receiving element 11 that has received high-intensity light including high-intensity communication light, it is possible to perform optical communication, as normal.

Further, in this embodiment, as described above, each of the plurality of light-receiving elements 11 is configured to include the photoelectric converter 11a and the electronic multiplier 11b. Further, the controller 15 is configured to perform control to invalidate the output from the light-receiving element 11 that has received high-intensity light by reducing the gain of the electronic multiplier 11b of the light-receiving element 11 that has received high-intensity light. Thus, it is possible to easily invalidate the output from the light-receiving element 11 that has received high-intensity light by simply reducing the gain of the electronic multiplier 11b of the light-receiving element 11, and therefore, it is possible to easily invalidate the output from the light-receiving element 11 that has received high-intensity light.

Further, in this embodiment, as described above, the first optical communication device 1 is configured to include a plurality of optical fibers 12 for guiding communication light to a plurality of light-receiving elements 11 provided so as to correspond to a plurality of light-receiving elements 11. With this, it is possible to guide the communication light to the plurality of light-receiving elements 11 by the plurality of optical fibers 12. For this reason, as compared with the case of directly emitting communication light to the light-receiving element 11, it is possible to more reliably receive the communication light by the light-receiving element. Further, in a case where communication light is guided to a plurality of light-receiving elements 11 by a plurality of optical fibers 12, certain optical fibers 12 may be placed in an environment on which high-intensity light may be easily incident. In this instance, high-intensity light is easily incident on the certain light-receiving elements 11, and therefore, it is very effective to invalidate the output from the light-receiving element 11 that has received high-intensity light when guiding communication light to a plurality of light-receiving elements 11 by a plurality of optical fibers 12.

[Modifications]

It should be understood that the embodiments disclosed here are examples in all respects and are not restrictive. The scope of the present invention is shown by claims rather than the descriptions of the embodiments described above, and includes all changes (modifications) within the meaning and scope equivalent to claims.

For example, in the above-described embodiment, an example is shown in which the optical communication device is used in the sea, but the present invention is not limited thereto. For example, the optical communication device may be used in water (e.g., a lake, a dam, or the like) other than undersea. Further, the optical communication device may also be used in environments (e.g., on land or the like) other than underwater.

Further, in the above-described embodiment, an example is shown in which the optical communication device is mounted on a fixed body fixed in water, but the present invention is not limited thereto. For example, the optical communication device may be mounted to a moving body that travels through the water.

Further, in the above-described embodiment, an example is shown in which the light-receiving element is configured by a photomultiplier tube, but the present invention is not limited thereto. For example, the light-receiving element may be configured by an avalanche photodiode.

Figure 7:
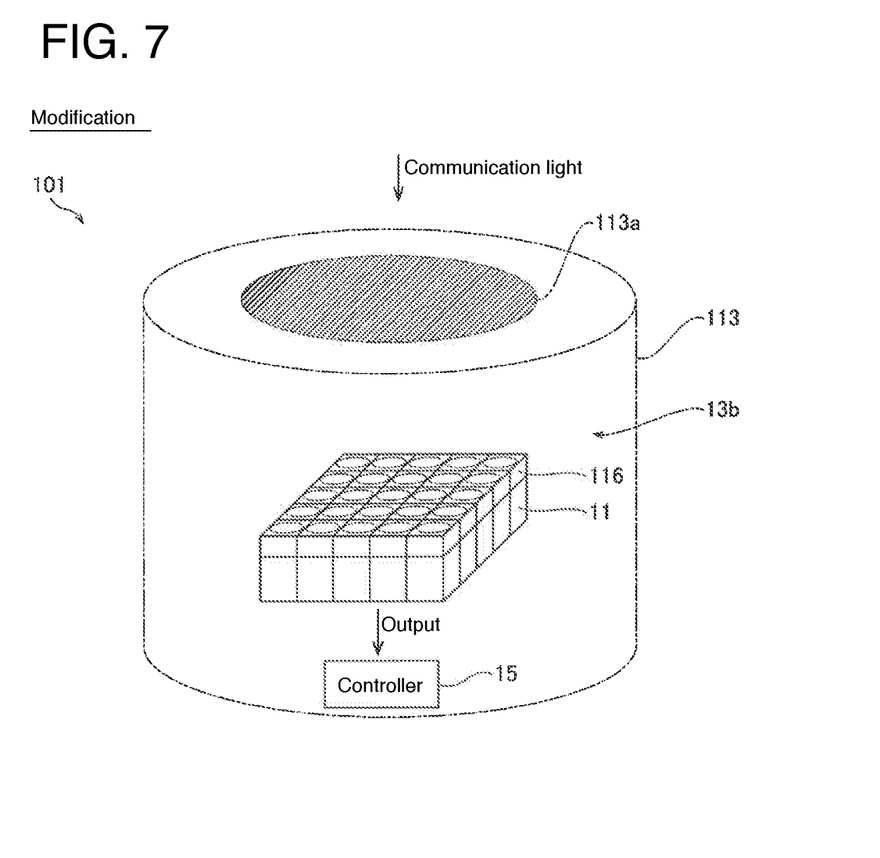
FIG. 7 is a schematic diagram showing a schematic configuration of a light-receiving unit of an underwater communication device according to a modification of one embodiment.

Further, in the above-described above embodiment, an example is shown in which the optical communication device includes optical fibers, but the present invention is not limited thereto. In the present invention, the optical communication device may not have optical fibers. For example, the optical communication device may be provided with lenses. The first optical communication device 101 of the modification shown in FIG. 7 is provided with a plurality of lenses 116 in place of a plurality of optical fibers 12 according to the above-described embodiment. The plurality of lenses 116 is configured to focus communication light on a plurality of light-receiving elements 11 so as to correspond to a plurality of light-receiving elements 11. With this, since it is possible to focus the communication light on the plurality of light-receiving elements 11 by the plurality of lenses 116, it is possible to receive more reliably communication light by the light-receiving elements 11. Each of the plurality of lenses 116 is arranged in the vicinity of each of the plurality of light-receiving elements 11. Further, the sealed pressure-resistant container 113 of the modification shown in FIG. 7 includes a window 113a instead of the insertion portions 13a according to the above-described embodiment. The windows 113a are configured to allow light, such as, e.g., communication light, to enter the inside of the sealed pressure-resistant container 113.

Further, in the above-described embodiment, an example is shown in which at least some of the plurality of light-incident end portions are arranged at positions different from each other, but the present invention is not limited thereto. For example, all of the plurality of light-incident end portions may be arranged at one location in the water.

Further, in the above-described embodiment, an example is shown in which at least some of the plurality of light-incident end portions are attached to an underwater structure other than a fixed body, but the present invention is not limited thereto. For example, at least some of the plurality of light-incident end portions may be attached to a fixed body, a sealed pressure-resistant container, or the like.

Further, in the above-described embodiment, an example is shown in which optical communication is performed between the fixed body fixed in water and the moving body moving in the water, but the present invention is not limited thereto. For example, optical communication may be performed between a moving body moving in water and a moving body moving in water.

Further, in the above-described embodiment, an example is shown in which a plurality of light-receiving elements is accommodated in a single sealed pressure-resistant container, but the present invention is not limited thereto. In the present invention, a plurality of light-receiving elements may be accommodated in a plurality of sealed pressure-resistant containers in a distributed manner. However, from the viewpoint of simplifying the structure of the optical communication device, it is preferable that a plurality of light-receiving elements be accommodated in a single sealed pressure-resistant container.

Further, in the above-described embodiment, an example is shown in which a plurality of light-receiving elements is arranged in an array, but the present invention is not limited thereto. For example, a plurality of light-receiving elements may be arranged in a distributed manner.

Further, in the above-described embodiment, an example is shown in which the moving body is an AUV (Autonomous Underwater Vehicle), but the present invention is not limited thereto. For example, the moving body may be a manned submersible (Human Occupied Vehicle). Further, the moving body may be a remotely controlled robot (ROV: Remotely Operated Vehicle) operated by a person via a cable. Further, the moving body may be a ship other than the above.

[Aspects]

It will be understood by those skilled in the art that the above-described exemplary embodiments are concrete examples of the following aspects.

(Item 1)

An optical communication device comprising:
  a plurality of light-receiving elements each configured to receive communication light, the plurality of light-receiving elements being provided so as to correspond to a plurality of channels; and
  a controller configured to perform control to invalidate output from a light-receiving element that has received high-intensity light higher in light intensity than a predetermined value among the plurality of light-receiving elements.

(Item 2)

The optical communication device as recited in the above-described Item 1,
  wherein the controller is configured to perform control to invalidate the output from the light-receiving element that has received the high-intensity light including high-intensity disturbance light among the plurality of light-receiving elements.

(Item 3)

The optical communication device as recited in the above-described Item 2,
  wherein the controller is configured to perform control to invalidate the output from the light-receiving element that has received the high-intensity light including high-intensity communication light among the plurality of light-receiving elements.

(Item 4)

The optical communication device as recited in any one of the above-described Items 1 to 3,
  wherein the plurality of light-receiving elements each includes a photoelectric converter and an electronic multiplier, and
  wherein the controller is configured to perform control to invalidate the output from the light-receiving element that has received the high-intensity light by reducing a gain of the electronic multiplier of the light-receiving element that has received the high-intensity light.

(Item 5)

The optical communication device as recited any one of the above-described Items 1 to 4, further comprising:

a plurality of optical fibers configured to guide the communication light to the plurality of light-receiving elements, the plurality of optical fibers being provided so as to correspond to the plurality of light-receiving elements.

(Item 6)

The optical communication device as recited in any one of the above-described Items 1 to 4, further comprising:
a plurality of lens configured to collect the communication light to the plurality of light-receiving elements, the plurality of lens being provided so as to correspond to the plurality of light-receiving elements.

DESCRIPTION OF SYMBOLS 1, 101: First optical communication device (optical communication device)
11: Light-receiving element
11a: Photoelectric converter
11b: Electronic multiplier
12: Optical fiber
15: Controller
116: Lens

The invention claimed is:

1. An optical communication device comprising:
a plurality of light-receiving elements each configured to receive communication light from a moving body, the plurality of light-receiving elements being provided so as to correspond to a plurality of channels;
a controller configured to perform control to invalidate output from a light-receiving element that has received high-intensity light higher in light intensity than a predetermined value among the plurality of light-receiving elements; and
a plurality of optical fibers configured to guide the communication light to the plurality of light receiving elements, the plurality of optical fibers being provided so as to correspond to the plurality of light receiving elements, wherein
at least some of light-incident end portions of the plurality of optical fibers are arranged at different positions in water.

2. The optical communication device as recited in claim 1,
wherein the controller is configured to perform control to invalidate the output from the light-receiving element that has received the high-intensity light including high-intensity disturbance light among the plurality of light-receiving elements.

3. The optical communication device as recited in claim 2,
wherein the controller is configured to perform control to invalidate the output from the light-receiving element that has received the high-intensity light including high-intensity communication light among the plurality of light-receiving elements.

4. The optical communication device as recited in claim 1,
wherein the plurality of light-receiving elements each includes a photoelectric converter and an electronic multiplier, and
wherein the controller is configured to perform control to invalidate the output from the light-receiving element that has received the high-intensity light by reducing a gain of the electronic multiplier of the light-receiving element that has received the high-intensity light.

5. The optical communication device as recited in claim 1, further comprising:
a plurality of lens configured to collect the communication light to the plurality of light-receiving elements, the plurality of lens being provided so as to correspond to the plurality of light-receiving elements.

* * * * *